United States Patent Office 3,422,182
Patented Jan. 14, 1969

3,422,182
METHOD OF TREATING AN ANIMAL HAVING DEMODECTIC MANGE
William A. Knapp, Jr., Topeka, Kans., assignor to Norden Laboratories, Inc., Lincoln, Nebr., a corporation of Delaware
No Drawing. Continuation of application Ser. No. 225,158, Sept. 20, 1962. This application Oct. 30, 1964, Ser. No. 407,910
U.S. Cl. 424—10     8 Claims
Int. Cl. A61k 25/00; A61k 27/00; A61d 7/00

This is a continuation of my copending application Ser. No. 225,158, filed Sept. 20, 1962, now abandoned.

This invention relates to the veterinary treatment of skin diseases of canines, and particularly the treatment of demodectic mange, summer eczema, and similar skin conditions.

Demodectic or red mange is a common skin disease of canines, and also most difficult to cure. It has heretofore been believed to be caused by a worm-like mite, known as *Demodex canis*, which lives in the hair follicles and the sebaceous glands of the skin. The life cycle of this parasite is not well understood. The females lay eggs which hatch into young similar in appearance to the adults except that they are smaller and have only three pairs of legs. These larvae undergo molts as do other mites, acquire a fourth pair of legs, and become adult males and females. The time required for the completion of the cycle is unknown.

Demodectic or red mange may affect canines of all ages, but it is most common in young animals, especially those of the short-haired breeds. The first evidence of the demodectic mange is the appearance of areas from which the hair has fallen out. These spots are usually slightly reddened and commonly occur around the eyes, on the head, elbows, hocks, toes, and elsewhere on the body. There is practically no itching at this time. Itching may become pronounced as the disease progresses. In the course of time the hairless areas bceome larger and the skin has a copper color, which accounts for the name "red mange." In severe cases, the skin may appear lead gray or bluish. During this period the mites are multiplying in the hair follicles and inflammatory changes become evident, with the appearance of small pustules.

The hairless, or depilatory, type of demodectic mange becomes complicated in the course of time through lowered resistance and the invasion of pus-producing bacteria which lead to the formation of small pimples, or pustules, in the hairless areas. As the pustular state progresses, the skin becomes thickened and is susceptible to injury by scratching, rubbing, or contact with various objects. There is very little itching in this state of the disease. Poisons are formed by the bacteria in the pustules, and the absorption of this toxic material deranges the body function and affects the general health of the animal, leading to emaciation, weakness, and the development of an unpleasant odor. The disease runs a slow course, often extending over a period of two years or longer. Unless it is treated, it usually terminates in death.

Heretofore the veterinary treatment of mange has been by external application of various solutions or ointments containing rotenone, sulfur, phenol, and similar drugs. In cases of sarcoptic and demodectic mange, the animals are clipped, bathed, and the crusts and scabs are removed before application of the ointment. In most instances, the ointment is applied only to a part of the body each day, so that several days are required to cover the entire body. The treatment involved requires several weeks to several months, and should be undertaken only by or under the supervision of a veterinarian, therefore, the expense involved in time and care of the afflicted animal is discouraging when it is known that the treatment often may result in failure to cure. Another difficulty with previous treatments is that the mties in the skin are not easily reached by external medication.

Various treatments have also been proposed for the treatment of mange by the internal administration of various medicines, antibiotics, fungicides, insecticides, dyes, and the like, in some instances with some success and in others without producing any results. Generally such treatments are beneficial in treating the secondary effects, but they do not effectively dispose of the mites or the underlying condition and the disease suddenly breaks out again. In fact, heavily infested cases have heretofore been considered incurable.

Demodectic mites in small numbers are present on virtually all normal dogs, presumably a constant or normal inhabitant of the dog's skin. Consequently, it is my belief that demodectic mange is not caused by the mite, but rather that the mite is a secondary invader of the skin and that the underlying cause is some physiological abnormality that renders the skin susceptible to invasion by the mites. I am of the opinion that the causitive agent of this disease, as well as other skin diseases such as summer eczema, can be broadly classed as a nutritional deficiency syndrome. However, I am inclined to believe that the nutritional aspects are directly correlated to the genotype of the individual or its inheritance; a genetic predisposition for diseases of the skin due to an inherited weakness or susceptibility. The underlying causitive agent is obscure. Any devitalizing condition may supposedly precipitate disease of the skin. Nevertheless, I am inclined to believe that there is a specific nutrient deficiency or faulty intestinal absorption of that nutrient or faulty metabolism after absorption. Following this theory and after much study of canine nutrition, it was concluded that the place to start was with medication to be administered into the alimentary tract of the animal.

As a result, I have discovered that zinc administered in the diet is very effective in the treatment of certain skin diseases, such as demodectic mange and summer eczema. It is, therefore, the principal object of my invention to provide a more satisfactory and reliable method for the treatment of mange and similar skin diseases by the administration of zinc in a form for administration in the drinking water or food of the animal, thereby more directly and effectively attacking the physical condition of the animal which I have found to be a principal underlying cause of such diseases.

The animals, when under treatment of high concentrations of zinc in the diet, are subject to zinc-induced anemia, and it is also an object of the invention to protect against the possibility of such anemia in the animal undergoing treatment by including with the zinc a suitable inhibitor.

The present invention contemplates as the active element a zinc preparation or complex in a form capable of absorption and usable in the metabolism of an afflicted animal. I have found effective zinc compounds to be zinc salts, such as zinc sulfate, zinc chloride, zinc carbonate, and others, depending upon the manner of administration. For example, if the administration is to be by way of drinking water, a water soluble zinc salt such as zinc sulfate or zinc choride is satisfactory. If the administration is to be by way of the food or pills, any one of the effective zinc salts may be used, however, zinc carbonate is perhaps the most desirable, since it is less toxic.

Since zinc is the effective medicament in the treatment of mange, it may be used without the anemia inhibitor. However, an inhibitor may be used in combination with the zinc. The zinc-induced anemia inhibitor when used is preferably copper sulfate.

When administration is to be by way of the drinking water, I have found that a satisfactory stock solution is prepared by dissolving 2.5 grams of zinc sulfate and 0.25 mg. of copper sulfate in one liter of water and adding six to eight drops of a food coloring to impart a deep color. The zinc sulfate is the active ingredient, and the copper sulfate is added to protect against possibility of zinc-induced anemia. The coloring is added to indicate that the drinking water to which a dosage of the stock solution has been added is medicated.

In proving the efficacy of the stock solution, dogs were selected which had been under all known treatment without improvement and which were considered hopeless. One ounce of the stock solution was placed in one quart or liter of drinking water in a drinking bowl. The final medicated water for consumption has a slight bluish or greenish tinge and indicates that the water in the bowl is medicated. The dogs were confined to assure that no other drinking water was consumed, and also to limit exercise so that the water consumption would not be excessive and to insure response because of better therapy, nutrition and general care.

The final concentration of zinc sulfate in the above dilution, as consumed, is approximately 2.25 mg. per ounce (30 cc.). 2500 mg. (2.5 gm.) divided by 1000 ml. equals 2.5 mg./ml. of stock solution. One ounce of stock solution, 30 ml. $\times$ 2.5 mg. is 75 mg. of zinc sulfate. This is placed in a quart of water, resulting in 0.075 mg./ml. of drinking water $\times$ 30 ml. (ounce) is 2.25 mg. zinc sulfate per ounce of drinking water.

A dog consuming 16 oz. or 480 ml. of medicated water would be receiving 36 mg. of zinc sulfate (37.5 mg. metric system). Larger dogs, or animals in hot environmental temperatures, will consume a quart of water per day or 75 mg. of zinc sulfate. This has been considered the maximum of medicated water for any dog per day in the experimental and clinical trials. Most canine house pets consume 250 to 750 cc. of water per day.

The ingredients were placed in each dog's drinking water as his only source of water for six weeks. None of these dogs received any external therapy, and 75% were cured during a short term observation period of two to three months after termination of the six weeks of treatment. Lesions that were open, raw sores prior to therapy became dry, eventually disappeared, and the hair returned.

Following the use of the treatment on the experimental dogs, the therapeutic regime of drinking water medication for six weeks was used on approximately fifty dogs belonging to individuals and by selected private veterinary practitioners. The therapy was used on the most severe and/or refractory cases of demodectic mange. Some of these dogs also received conventional external therapy at the same time. The results reported showed initial response or recovery in 75% of the cases.

When the zinc medicament is to be administered by placing it in the dog's food, the mixture is prepared in concentrations that would permit the same amount of zinc to be taken into the body over a period of six weeks.

The zinc medicament may also be administered by tablet or capsule.

The dose may be increased, although zinc sulfate in certain concentrations could produce nausea because of its metallic taste and irritant qualities. However, the increased dosage should be well mixed in the food or administered in the drinking water on a partially filled or full stomach. Increased amounts of zinc are definitely beneficial. No toxic symptoms have been encountered with the dosage above described.

Dogs may be treated for summer eczema and other skin conditions in like manner.

The response and improvement from the above treatment far exceeded that which could be expected from external and internal treatment methods which have been used heretofore.

The dogs, after responding to the treatment, showed other beneficial effects, such as improved appetite, increased physical activity, and general alertness.

While I have specifically described the treatment based upon zinc sulfate, other zinc salts, such as zinc chloride and zinc carbonate, are also effective when used in like manner.

From the above it is obvious that I have discovered a new method for the treatment of dogs afflicted with demodectic mange, summer eczema, and like skin diseases, which is simple and inexpensive and which may usually be administered to the dog in his home environment, where he responds most readily to treatment, without the necessity of long and expensive veterinary hospital treatment, although under the supervision of a veterinarian.

What I claim and desire to secure by Letters Patent is:

1. A method of treating a dog having demodectic mange, comprising
    orally introducing into the alimentary tract of the dog afflicted with demodectic mange a zinc salt in an amount effective to treat the disease and capable of absorption and usable in the metabolism of the afflicted dog.

2. A method of treating a dog having demodectic mange, comprising
    orally introducing into the alimentary tract of the dog afflicted with demodectic mange a zinc salt in an amount effective to treat the disease and capable of absorption and usable in the metabolism of the afflicted dog and copper sulfate in an amount for protecting the dog from zinc anemia.

3. A method of treating a dog having demodectic mange, which method comprises
    orally introducing into the alimentary tract of the dog afflicted with demodectic mange a zinc salt in an amount effective to treat the disease and selected from the group consisting of zinc sulfate, zinc chloride and zinc carbonate.

4. A method of treating a dog having demodectic mange, which method comprises
    orally introducing into the alimentary tract of the dog afflicted with demodectric mange a medicament containing a zinc salt in an amount effective to treat the disease and selected from the group consisting of zinc sulfate, zinc chloride and zinc carbonate, and
    said medicament also containing copper sulfate in an amount for protecting the dog from zinc anemia.

5. A method of treating a dog having demodectic mange, which method comprises
    orally introducing into the alimentary tract of the dog afflicted with demodectic mange a drinking water composition containing as the active ingredient an effective amount to treat the disease of a zinc salt selected from the group consisting of zinc sulfate, zinc chloride, and zinc carbonate.

6. A method for treating a dog having demodectic mange, which method comprises
    orally introducing into the alimentary tract of the dog afflicted with demodectic mange a drinking water composition containing as the active ingredient an effective amount to treat the disease of a zinc salt selected from the group consisting of zinc sulfate, zinc chloride and zinc carbonate and containing copper sulfate in an amount for protecting the dog against zinc anemia.

7. A method for treating a dog having demodectic mange, which method comprises
    orally introducing into the alimentary tract of the dog afflicted with demodectric mange a drinking water composition containing as the active ingredient a zinc salt in the concentration of approximately 2.25 mg. of the zinc salt per ounce of drinking water, said zinc salt being selected from the group consisting of zinc sulfate, zinc chloride and zinc carbonate.

8. A method for treating a dog having demodectic mange, which method comprises orally introducing a drinking water composition containing as the active ingredient a zinc salt and copper sulfate solution into the alimentary tract of the dog afflicted with demodectic mange in the concentration of approximately 2.25 mg. of the zinc salt per ounce of drinking water and copper sulfate in an amount sufficient to protect the animal from zinc anemia, said zinc salt being selected from the group consisting of zinc sulfate, zinc chloride and zinc carbonate.

References Cited

Hutyra: Special Pathology and Therapeutics, p. 678, vol. 3, 1938.

ALBERT T. MEYERS, *Primary Examiner.*

H. ELLIS, *Assistant Examiner.*

U.S. Cl. X.R.

424—140, 143, 145